(12) United States Patent
Utsumi

(10) Patent No.: US 9,147,907 B2
(45) Date of Patent: *Sep. 29, 2015

(54) NONAQUEOUS ELECTROLYTE AND LITHIUM ION RECHARGEABLE BATTERY

(75) Inventor: Hisayuki Utsumi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 665 days.

This patent is subject to a terminal disclaimer.

(21) Appl. No.: 13/530,288

(22) Filed: Jun. 22, 2012

(65) Prior Publication Data

US 2012/0328937 A1     Dec. 27, 2012

(30) Foreign Application Priority Data

Jun. 24, 2011   (JP) ................................ P2011-141256

(51) Int. Cl.
*H01M 10/0567* (2010.01)
*H01M 6/16* (2006.01)
*H01M 10/052* (2010.01)

(52) U.S. Cl.
CPC .......... *H01M 10/0567* (2013.01); *H01M 6/168* (2013.01); *H01M 10/052* (2013.01); *H01M 2300/0025* (2013.01); *Y02E 60/122* (2013.01)

(58) Field of Classification Search
CPC .......... H01M 10/0567; H01M 10/052; H01M 6/168; H01M 2300/0025; Y02E 60/122
See application file for complete search history.

(56) References Cited

U.S. PATENT DOCUMENTS

| 5,427,874 A | 6/1995 | Sugeno |
| 2011/0190414 A1 | 8/2011 | Hisha et al. |

FOREIGN PATENT DOCUMENTS

| JP | 6-333594 | 12/1994 |
| JP | 2007-200605 | 8/2007 |
| WO | 2010/041710 | 4/2010 |

*Primary Examiner* — Laura Weiner
(74) *Attorney, Agent, or Firm* — Nixon & Vanderhye P.C.

(57) ABSTRACT

A nonaqueous electrolyte which is capable of improving the charging and discharging characteristics of a lithium ion rechargeable battery and a lithium ion rechargeable battery with excellent charging and discharging characteristics are provided. The nonaqueous electrolyte is one that is capable of being used in a lithium ion rechargeable battery and includes an electrolytic salt and the compound represented by the following formula (1):

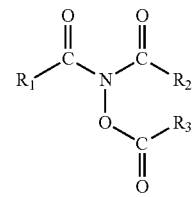

(1)

wherein $R_1$, $R_2$, and $R_3$ may be the same or different, and represent a hydrogen atom, or a lower alkyl group, a lower alkenyl group, a lower alkoxy group, a lower alkoxycarbonyl group, a lower alkylcarbonyl group, a lower cycloalkyl group or an aryl group, which may be substituted.

32 Claims, 1 Drawing Sheet

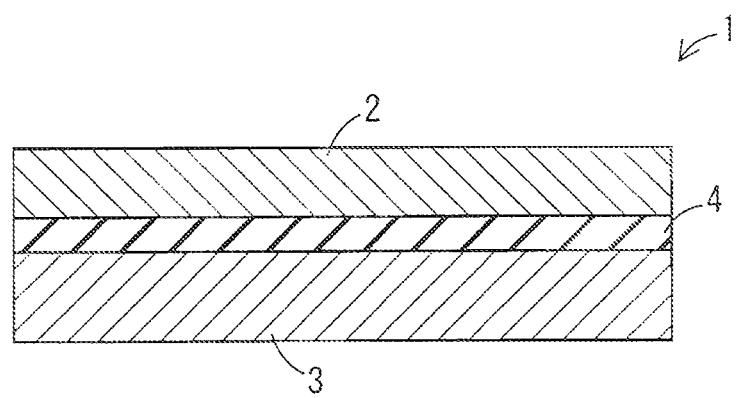

NONAQUEOUS ELECTROLYTE AND LITHIUM ION RECHARGEABLE BATTERY

CROSS-REFERENCE TO RELATED APPLICATION

This application claims priority to Japanese Patent Application No. 2011-141256, which was filed on Jun. 24, 2011, the contents of which are incorporated herein by reference in its entirety.

BACKGROUND OF THE TECHNOLOGY

1. Field of the Technology

The present technology relates to a nonaqueous electrolyte and a lithium ion rechargeable battery.

2. Description of the Related Art

Due to high energy density thereof, lithium ion rechargeable batteries have been widely used as power sources for portable electronic devices, such as video cameras, mobile phones, notebook PCs and mini-discs, for which miniaturization and weight reduction are progressing.

Further, since the energy efficiency thereof (power efficiency) during charging and discharging is high in comparison with lead storage batteries or nickel-metal hydride batteries, lithium ion rechargeable batteries may also be used in electric vehicles or for power storage purposes and development regarding medium and large size batteries is actively being pursued.

As the lithium ion rechargeable batteries, ones including an anode formed of a crystalline carbon material such as graphite having excellent lithium occlusion and emission, a cathode formed of a complex oxide of lithium and transition metals, and a nonaqueous electrolyte, are most commonly used. As the nonaqueous electrolyte, for example, ones in which lithium salts such as $LiBF_4$, $LiPF_6$, $LiN(SO_2CF_3)_2$ or the like are added to a mixed solvent (nonaqueous solvent) of highly dielectric cyclic carbonates, such as propylene carbonate and ethylene carbonate, and low viscosity chained carbonates, such as diethyl carbonate, methyl ethyl carbonate, and dimethyl carbonate, are in general use. However, cyclic carbonates, in particular, propylene carbonate, are reduced and decomposed at the electrically active anode surface, and the occlusion and emission of the lithium regarding the graphite may be disturbed. As a result, the internal resistance of the battery is increased, voltage fluctuations become large, the charging and discharging characteristics of the battery are deteriorated, and the battery life is reduced. Further, electrolytes including ethylene carbonate harden at low temperatures, and the ion conductivity thereof is deteriorated. The deterioration of the ion conductivity of the electrolyte causes an increase in the internal resistance of the battery as well as deterioration in the charging and discharging characteristics.

In consideration of the above-described problem, for example, vinylene carbonate, ethylene sulfide or the like is added to the nonaqueous electrolyte including the highly dielectric cyclic carbonates and the low viscosity chained carbonates. These additives prevent the decomposition of the cyclic carbonates and improve the charging and discharging characteristics of the battery by forming a protective film having ion conductivity on the anode surface. Further, there has been proposed a nonaqueous electrolyte containing pyrocarbonate having an alkyl group as the nonaqueous solvent (for example, refer to Japanese Unexamined Patent Publication JP-A 6-333594 (1994)).

However, at present, since there is a demand to further extend the operating time per charging of the lithium ion rechargeable battery, there is a demand for a lithium ion rechargeable battery for which deterioration of the nonaqueous electrolyte due to the charging and discharging cycle, increases in the internal resistance, and voltage fluctuations are small, and which is capable of stably exhibiting high level charging and discharging characteristics across a wide temperature range from a low temperature (for example, approximately −10° C. to 20° C.) to a high temperature (for example, approximately 60° C.)

SUMMARY OF THE TECHNOLOGY

Accordingly, an object of the technology is to provide a nonaqueous electrolyte capable of improving the charging and discharging characteristics of a lithium ion rechargeable battery, and a lithium ion rechargeable battery having excellent charging and discharging characteristics.

The technology provides a nonaqueous electrolyte, capable of being used in a lithium ion rechargeable battery, including:

an electrolytic salt; and an amine derivative represented by the following formula (1):

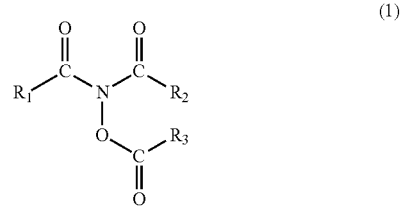

wherein, $R_1$, $R_2$, and $R_3$ may be the same or different, and represent a hydrogen atom, or a lower alkyl group, a lower alkenyl group, a lower alkoxy group, a lower alkoxycarbonyl group, a lower alkylcarbonyl group, a lower cycloalkyl group or an aryl group, which may be substituted.

Further, in the nonaqueous electrolyte, it is preferable that the amine derivative is a compound in which $R_1$, $R_2$ and $R_3$ in the formula (1) is selected from a lower alkyl group, a lower cycloalkyl group and an aryl group, which may be substituted.

Further, the technology provides a lithium ion rechargeable battery including:

a cathode provided with a current collector having a cathode active material;

an anode provided with a current collector having an anode active material; and a nonaqueous electrolyte including an electrolytic salt and an amine derivative represented by the following formula (1):

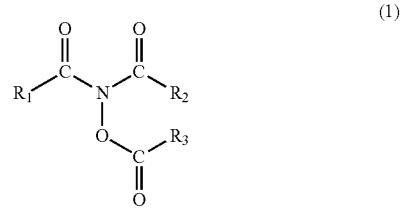

wherein, $R_1$, $R_2$, and $R_3$ may be the same or different, and represent a hydrogen atom, or a lower alkyl group, a lower alkenyl group, a lower alkoxy group, a lower alkoxycarbonyl group, a lower alkylcarbonyl group, a lower cycloalkyl group or an aryl group, which may be substituted.

Further, in the lithium ion rechargeable battery, it is preferable that the amine derivative is a compound in which $R_1$, $R_2$ and $R_3$ in the formula (1) is selected from a lower alkyl group, a lower cycloalkyl group and an aryl group, which may be substituted.

It is preferable that the lower alkyl group is a straight-chain or branched alkyl group having 1 to 6 carbon atoms.

It is preferable that the lower alkyl group is selected from a group consisting of a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, and an isohexyl group.

It is preferable that the lower alkenyl group is a straight-chain or branched alkenyl group having 1 to 6 carbon atoms.

It is preferable that the lower alkenyl group is selected from a group consisting of a vinyl group, a 1-propenyl group, an allyl group, a 1-butenyl group, a 2-butenyl group, and a 3-butenyl group.

It is preferable that the lower alkoxy group is a straight-chain or branched alkoxy group having 1 to 6 carbon atoms.

It is preferable that the lower alkoxy group is selected from a group consisting of a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a neopentyloxy group, a tert-pentyloxy group, an n-hexyloxy group, and an isohexyloxy group.

It is preferable that the lower alkoxycarbonyl group is a group which is derived from a lower fatty acid and in which a hydroxyl group is removed from a lower fatty acid.

It is preferable that the lower alkoxycarbonyl group is selected from a group consisting of a formyloxy group, an acetoxy group, a propionyloxy group, a butyryloxy group, an isobutyryloxy group, a valeryloxy group, an isovaleryloxy group, and a pivaloyloxy group.

It is preferable that the lower alkylcarbonyl group is an acyl group derived from a lower fatty acid.

It is preferable that the lower alkylcarbonyl group is selected from a group consisting of a formyl group, an acetyl group, a propionyl group, a butyryl group, an isobutyryl group, a valeryl group, an isovaleryl group, and a pivaloyl group.

It is preferable that the lower cycloalkyl group is a cycloalkyl group having 3 to 6 carbon atoms.

It is preferable that the lower cycloalkyl group is selected from a group consisting of a cyclopropyl group, a cyclobutyl group, a cyclopentyl group, and a cyclohexyl group.

It is preferable that the aryl group is an aryl group having 6 to 10 carbon atoms.

It is preferable that the aryl group is selected from a group consisting of a phenyl group, a 1-naphthyl group, and a 2-naphthyl group.

The nonaqueous electrolyte may be used in a lithium ion rechargeable battery, and includes an electrolytic salt and a compound represented by the above formula (1). The amine derivative which is the compound represented by formula (1) has a structure in which two carbonyl groups are bonded to a nitrogen atom and an ester bond is combined therewith. By using a nonaqueous electrolyte including the amine derivative having this kind of structure, it is possible to improve the charging and discharging characteristics of the lithium ion rechargeable battery.

The lithium ion rechargeable battery includes a cathode provided with a current collector having a cathode active material, an anode provided with a current collector having an anode active material, and a nonaqueous electrolyte. The nonaqueous electrolyte includes an electrolytic salt and an amine derivative represented by the above formula (1). By using the nonaqueous electrolyte including the amine derivative, it is possible to make a lithium ion rechargeable battery having excellent charging and discharging characteristics.

BRIEF DESCRIPTION OF DRAWINGS

Other and further objects, features, and advantages will be more explicit from the following detailed description taken with reference to the drawings wherein:

FIG. 1 is a cross-sectional view showing a lithium ion rechargeable battery according to an embodiment.

DETAILED DESCRIPTION

Now referring to the drawings, preferred embodiments are described below.

[Nonaqueous Electrolyte]

The nonaqueous electrolyte of the embodiment is one that may be used in a lithium ion rechargeable battery, and is a composition including an electrolytic salt, an amine derivative represented by the following formula (1), and other arbitrary additives:

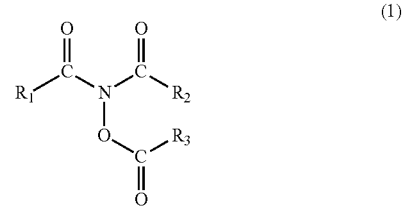

(1)

In the formula (1), $R_1$, $R_2$, and $R_3$ may be the same or different, and represent a hydrogen atom, or a lower alkyl group, a lower alkenyl group, a lower alkoxy group, a lower alkoxycarbonyl group, a lower alkylcarbonyl group, a lower cycloalkyl group or an aryl group, which may be substituted.

In the embodiment, "lower" means, for example, a number of carbon atoms of 1 to 6. However, in the case of the cycloalkyl group, it means, for example, a number of carbon atoms of 3 to 6.

Examples of the lower alkyl group include a straight-chain or branched alkyl group having 1 to 6 carbon atoms. Specifically, examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, and an isohexyl group. Among these, an alkyl group having 1 to 4 carbon atoms is preferable, and a methyl group and a tert-butyl group are particularly preferable.

Examples of the lower alkenyl group include a straight-chain or branched alkenyl group having 1 to 6 carbon atoms, and a straight-chain alkenyl group having 1 to 4 carbon atoms is preferable. Specifically, examples thereof include a vinyl group, a 1-propenyl group, an allyl group (2-propenyl group), a 1-butenyl group, a 2-butenyl group, and a 3-butenyl group. Among these, a vinyl group is particularly preferable.

Examples of the lower alkoxy group include a straight-chain or branched alkoxy group having 1 to 6 carbon atoms. Specifically, examples thereof include a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a neopentyloxy group, a tert-pentyloxy group, an n-hexyloxy group, and an isohexyloxy group. Among these, an alkoxy group having 1 to 4 carbon atoms is preferable, and a methoxy group is particularly preferable.

Examples of the lower alkoxycarbonyl group include a group which is derived from a lower fatty acid and in which a hydroxyl group is removed from a lower fatty acid. Specifically, examples thereof include a formyloxy group, an acetoxy group, a propionyloxy group, a butyryloxy group, an isobutyryloxy group, a valeryloxy group, an isovaleryloxy group, and a pivaloyloxy group. Among these, an alkoxycarbonyl group having 1 to 4 carbon atoms is preferable, and an acetoxy group is particularly preferable.

Examples of the lower alkylcarbonyl group include an acyl group derived from a lower fatty acid, that is, a lower fatty acid acyl group. Specifically, examples thereof include a formyl group, an acetyl group, a propionyl group, a butyryl group, an isobutyryl group, a valeryl group, an isovaleryl group, and a pivaloyl group. Among these, an alkylcarbonyl group having 1 to 4 carbon atoms is preferable, and an acetyl group is particularly preferable.

Examples of the lower cycloalkyl group include a cycloalkyl group having 3 to 6 carbon atoms. Specifically, examples thereof include a cyclopropyl group, a cyclobutyl group, a cyclopentyl group, and a cyclohexyl group. Among these, a cycloalkyl group having 3 or 4 carbon atoms is preferable, and a cyclopropyl group or a cyclobutyl group is particularly preferable.

Examples of the aryl group include an aryl group having 6 to 10 carbon atoms. Specifically, examples thereof include a phenyl group, a 1-naphthyl group, and a 2-naphthyl group. Among these, a phenyl group or a 2-naphthyl group is particularly preferable.

Examples of the substituent for $R_1$ to $R_3$ include halogen atoms such as fluorine atoms, chlorine atoms, or bromine atoms, an alkyl group such as a methyl group or an ethyl group, an alkoxy group such as a methoxy group or an ethoxy group, and an aryl group such as a phenyl group.

In the nonaqueous electrolyte of the embodiment, it is preferable that the amine derivative represented by the above formula (1) is a compound in which $R_1$, $R_2$ and $R_3$ in the formula (1) is selected from a lower alkyl group, a lower cycloalkyl group and an aryl group, which may be substituted.

In the nonaqueous electrolyte of the embodiment, the amine derivative represented by the above formula (1) may be allowed to function as a nonaqueous solvent. Accordingly, as long as it is possible to obtain a nonaqueous electrolyte with sufficient characteristics only with the amine derivative represented by the above formula (1), it is not necessary to use any other organic solvents. However, from the viewpoint of improving the charging and discharging characteristics and the low-temperature resistance property of the lithium ion rechargeable battery, the nonaqueous electrolyte is preferably a mixed solvent of the amine derivative represented by the above formula (1) and another organic solvent.

As the other organic solvent, generally, it is possible to use an aprotic organic solvent. The aprotic organic solvent is not particularly limited; however, in consideration of electrochemical oxidation-reduction stability, chemical stability, and the like, esters are preferable. Examples of the esters include cyclic esters and chained esters.

Specific examples of the cyclic esters include cyclic carbonates such as ethylene carbonate, propylene carbonate, butylene carbonate, fluoroethylene carbonate, and trifluoroethylene carbonate; and cyclic carboxylic acid esters such as γ-butyrolactone, and γ-valerolactone.

Specific examples of the chained esters include chained carbonates such as dimethyl carbonate, diethyl carbonate, dipropyl carbonate, ethyl methyl carbonate, methyl propyl carbonate, methyl trifluoroethyl carbonate, ditrifluoroethyl carbonate, dibutyl carbonate, and methyl octyl carbonate; and chained carboxylate esters such as methyl formate, methyl acetate, methyl propionate, pentafluoropropyl acetate, and methyl trifluoroacetate.

Even when used at low temperatures, in consideration of stably exhibiting high level charging and discharging characteristics and the like, combined use of a cyclic ester and a chained ester is preferable. Furthermore, in consideration of the electrochemical stability of the nonaqueous electrolyte and the like as well as the improvement of the negative charge characteristic of the battery, the low temperature characteristic and the like, in a system combining the cyclic ester and the chained ester, the use of a cyclic carbonate as the cyclic ester and the use of a chained carbonate as the chained ester are preferable.

Examples of organic solvents other than the above-described cyclic esters and chained esters include tetrahydrofuran, 2-methyltetrahydrofuran, dimethyl sulfoxide, 1,3-dioxolane, formamide, dimethyl formamide, acetonitrile, diethyl ether, 1,2-dimethoxyethane, 1,2-diethoxyethane, ethoxymethoxyethane, dioxane, sulfolane, and methyl sulfolane.

In a case where the amine derivative represented by the above formula (1) is made to function as the nonaqueous electrolyte, it is preferable to combine the above-described cyclic ester (preferably, cyclic carbonate) and the amine derivative to make a nonaqueous solvent.

The blending ratio of the amine derivative is normally in the range of 0.09% to 80% (v/v) as a volume fraction in the nonaqueous electrolyte. In the case of less than 0.09%, the effect according to the content of the amine derivative may not be sufficiently exhibited. In the case of greater than 80%, the function of the nonaqueous rechargeable battery may be deteriorated in low-temperature environments. A more preferable blending ratio is in a range of 0.47% to 40% and an even more preferable blending ratio is in a range of 0.95% to 20%.

As the electrolytic salt, lithium salt is normally used. The lithium salt is not particularly limited as long as it is one which dissolves in a nonaqueous solvent. Examples thereof include $LiClO_4$, $LiCl$, $LiBF_4$, $LiPF_6$, $LiAsF_6$, $LiSbF_6$, $LiN(SO_2CF_3)_2$, $LiC(SO_2CF_3)_2$, a lower aliphatic carboxylic acid, lithium chloroborane, and lithium 4-phenylboronate. These lithium salts may be used each alone, or two or more of them may be used in a combination. Preferable additive amounts of the lithium salts are preferably 0.1 to 3 moles, and more preferably 0.5 to 2 moles, with respect to 1 kg of nonaqueous solvent.

Examples of other additives include dehydrating agents and deoxidizing agents which are known in the related art. Specifically, examples thereof include vinylene carbonate, fluoroethylene carbonate, trifluoropropylene carbonate, phenyl ethylene carbonate, succinic anhydride, glutaric anhydride, maleic anhydride, ethylene sulfite, 1-3-propanesultone, 1-4-butanesultone, methyl methanesulfonate, dibutyl sulfide, heptane, octane, and cycloheptane. When these are normally included in the nonaqueous solvent at a concentration of 0.1% by weight or more and 5% by weight or less, it is possible to improve the capacity maintenance characteristic and cycle characteristic after storage at high temperature.

[Lithium Ion Rechargeable Battery]

FIG. 1 is a cross-sectional view showing a lithium ion rechargeable battery 1 according to an embodiment. The lithium ion rechargeable battery 1 of the embodiment includes a cathode 2 provided with a cathode current collector having a cathode active material, an anode 3 provided with an anode current collector having an anode active material, and a nonaqueous electrolyte. The nonaqueous electrolyte provided for the lithium ion rechargeable battery 1 is the nonaqueous electrolyte of the above-described embodiment.

The cathode 2 may be manufactured, for example, by coating a cathode current collector with a paste including a cathode active material, a conductive material, a binding agent, and an organic solvent, and drying the coat and applying pressure to the coated cathode current collector. The blending quantity of the cathode active material, the conductive material, the binding agent, and the organic solvent may be set such that, the conductive material is 1 to 20 parts by weight, the binding agent is 1 to 15 parts by weight, and the organic solvent is 30 to 60 parts by weight, with respect to 100 parts by weight of the cathode active material.

As the cathode active material, for example, lithium complex oxides such as $LiNiO_2$, $LiCoO_2$, $LiMn_2O_4$ and $LiFePO_4$, and compounds obtained by partially replacing elements in these oxides with another elements (for example, Fe, Si, Mo, Cu, Zn, or the like) may be used.

Examples of the conductive material include carbonaceous materials such as acetylene black or ketjen black.

Examples of the binding agent include polyvinylidene fluoride (PVdF) and polyvinylpyridine, polytetrafluoroethylene.

Examples of the organic solvent include N-methyl-2-pyrrolidone (NMP) and N,N-dimethylformamide (DMF).

Examples of the cathode current collector include a conductive metal foil or thin plate of stainless steel (SUS) or aluminum.

Further, the anode 3 may be manufactured, for example, by coating an anode current collector with a paste including an anode active material, a conductive material, a binding agent, and an organic solvent, drying the coat, and applying pressure to the coated anode current collector. The blending quantity of the anode active material, the conductive material, the binding agent, and the organic solvent may be set such that, with respect to 100 parts by weight of the anode active material, the conductive material is 1 to 15 parts by weight, the binding agent is 1 to 10 parts by weight, and the organic solvent is 40 to 70 parts by weight.

Examples of the anode active material include pyrolytic carbons, cokes, graphites, glass-like carbons, organic polymer compound sintered bodies, carbon fibers, and active carbon.

Examples of the conductive material include carbonaceous materials such as acetylene black or ketjen black.

Examples of the binding agent include polyvinylidene fluoride, polyvinylpyridine, and polyethylene tetrafluoride.

Examples of the organic solvent include N-methyl-2-pyrrolidone (NMP) and N,N-dimethylformamide (DMF).

Examples of the anode current collector include a metal foil such as copper.

A separator 4 is normally interposed between the anode 3 and the cathode 2. The separator 4 is a film which electrically insulates the cathode 2 and the anode 3 and transmits lithium ions, and a porous film, non-woven fabric, or the like may be used. The material of the separator 4 is selected in consideration of solvent resistance and reducibility resistance. For example, a porous film formed of a polyolefin resin such as polyethylene or polypropylene, or a non-woven fabric is preferable. The separator 4 can be used by setting the above materials as a single layer or a plurality of layers. In the case of a plurality of layers, non-woven fabric is preferably used as at least one layer from the viewpoint of the cycle characteristic, low-temperature performance, negative charge characteristic, and the like.

By interposing the separator 4 between the anode 3 and the cathode 2 arbitrarily and pouring the nonaqueous electrolyte therein, a lithium ion rechargeable battery 1 is obtained. Further, the lithium ion rechargeable battery 1 may be made as a single unit, and a plural number of single units may be laminated.

As the other constituent components of the lithium ion rechargeable battery 1, it is possible to use known components which are in general use.

Further, as the form of the lithium ion rechargeable battery 1, various forms such as a button type, a coin type, a rectangular shape, a cylindrical type having a spiral structure, and a laminated-type battery may be exemplified without limitation and, depending on the purpose, these may be set to various sizes such as thin or large.

Since the lithium ion rechargeable battery 1 of the embodiment includes a nonaqueous electrolyte including the amine derivative represented by formula (1), it is possible to obtain a lithium ion rechargeable battery 1 for which deterioration of the nonaqueous electrolyte due to the charging and discharging cycle is small, and for which the charging and discharging characteristics are excellent across a wide temperature range from a low temperature (for example, approximately −10° C. to 20° C.) to a high temperature (for example, approximately 60° C.)

EXAMPLES

Hereinafter, the technology will be described in details with reference to Examples, however the technology is not limited by the Examples described below.

Example 1

To 99.5 g of a mixed solvent (aprotic organic solvent) of ethylene carbonate (EC) and diethylene carbonate (DEC) (mixture ratio (volume ratio); ethylene carbonate/diethylene carbonate=1/2), 0.5 g of N,N,O-triacetylhydroxylamine (manufactured by Tokyo Chemical Industry Co., Ltd.) represented by the following formula (2) as the amine derivative (amine derivative A) was added. In the obtained mixed solvent, $LiPF_6$ was dissolved at a concentration of 1.0 mol/kg as a lithium salt and a nonaqueous electrolyte was prepared.

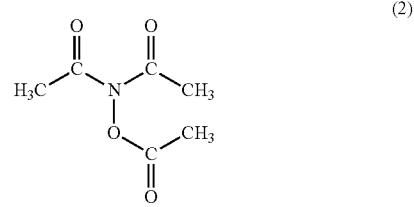

(2)

Using a planetary mixer, 100 parts by weight of $LiMn_2O_4$ as the cathode active material, 5 parts by weight of acetylene black as the conductive material, 5 parts by weight of PVdF as the binding agent, and 40 parts by weight of NMP as the organic solvent were kneaded, and a paste for forming a cathode was produced by dispersion. In a coating device, the produced paste was evenly coated on both surfaces of a belt-shaped aluminum foil having a thickness of 20 μm which was the cathode current collector. Here, an uncoated portion for connection to a terminal was set at the edge portion of the aluminum foil. After drying the coated film under reduced pressure for 8 hours at a temperature of 130° C. to remove the solvent, a cathode plate was formed by pressing using a hydraulic pressing device. The obtained cathode plate was cut out to a desired size and used.

Using a planetary mixer, 100 parts by weight of natural graphite powder (average particle diameter of 15 μm) manufactured in China as the anode active material, 2 parts by weight of vapor grown carbon fiber (VGCF) powder (high bulk product of VGCF manufactured by Showa Denko, Ltd.) as the conductive material, 2 parts by weight of PVdF as the binding agent, and 50 parts by weight of NMP as the organic solvent were kneaded, and a paste for forming an anode was produced by dispersion. In a coating device, the produced paste was evenly coated on both surfaces of a copper foil having a thickness of 10 μm which was the anode current collector. Here, an uncoated portion for connection to a terminal was set at the edge portion of the copper foil. After drying the coated film under reduced pressure for 8 hours at a temperature of 100° C. to remove the solvent, an anode plate was formed by pressing using a hydraulic pressing device. The obtained anode plate was cut out to a desired size and used.

The obtained cathode plate and the anode plate were laminated interposing a polypropylene porous film as a separator, and then the nonaqueous electrolyte was poured into the laminated body to produce a lithium ion rechargeable battery.

Example 2

Except that the use amount of the mixed solvent of ethylene carbonate (EC) and diethylene carbonate (DEC) was set to 97 g and the use amount of N,N,O-triacetylhydroxylamine (manufactured by Tokyo Chemical Industry Co., Ltd.) (amine derivative A) represented by the above-mentioned formula (2) was set to 3 g, a lithium ion rechargeable battery was produced in the same manner as in Example 1.

Example 3

Except that the use amount of the mixed solvent of ethylene carbonate (EC) and diethylene carbonate (DEC) was set to 99.5 g and the use amount of N,N-diacetyl-O-benzoylhydroxylamine (amine derivative B) represented by the following formula (3) was set to 0.5 g, a lithium ion rechargeable battery was produced in the same manner as in Example 1.

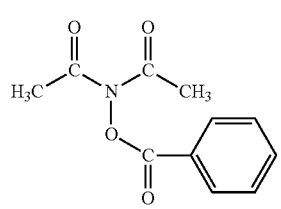

Example 4

Except that the use amount of the mixed solvent of ethylene carbonate (EC) and diethylene carbonate (DEC) was set to 99.5 g and the use amount of N,N-diacetyl-O-cyclohexylcarbonylhydroxylamine (amine derivative C) represented by the following formula (4) was set to 0.5 g, a lithium ion rechargeable battery was produced in the same manner as in Example 1.

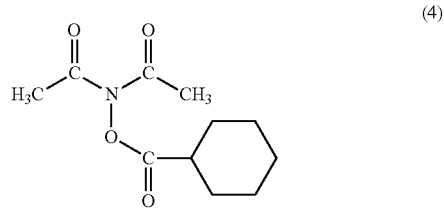 [SMILES: CC(=O)N(OC(=O)C1CCCCC1)C(C)=O]

Example 5

First, 20 ml of Ethylene carbonate (EC) was mixed with 80 ml of N,N,O-triacetylhydroxylamine (manufactured by Tokyo Chemical Industry Co., Ltd.) (amine derivative A) represented by the above-described formula (2) to prepare a mixed solvent (mixture ratio (volume ratio); ethylene carbonate/amine derivative A=¼). In the obtained mixed solvent, $LiPF_6$ was dissolved at a concentration of 1.0 mol/kg as a lithium salt and a nonaqueous electrolyte was produced. Except for the above, a lithium ion rechargeable battery was produced in the same manner as in Example 1.

Comparative Example 1

Except that the amine derivative A was not used, a lithium ion rechargeable battery was produced in the same manner as in Example 1.

Comparative Example 2

Except that the use amount of the mixed solvent of ethylene carbonate (EC) and diethylene carbonate (DEC) was set to 99.5 g and the use amount of dimethyl dicarbonate (manufactured by Tokyo Chemical Industry Co., Ltd.) (pyrocarbonate A) disclosed in JP-A 6-333594 was set to 0.5 g instead of the amine derivative A, a lithium ion rechargeable battery was produced in the same manner as in Example 1.

(Method for Examining Performance of Lithium Ion Rechargeable Battery)

For the lithium ion rechargeable batteries obtained by Examples 1 to 5 and Comparative Examples 1 and 2, measurement of the initial discharge capacity and measurement of the discharge capacity maintenance rate at 20° C. and 60° C. were performed using the procedure below.

<Measurement of Initial Discharge Capacity at 20° C.>

After charging the lithium ion rechargeable battery up to 4.2 V at a rate of 0.1 CmA, discharging was performed at a rate of 0.1 CmA and the capacity when discharging was performed such that the voltage became 3.0 V was set as the initial discharge capacity (mAh/g). Here, the measurement was performed inside an incubator at a constant 20° C.

<Measurement of Discharge Capacity Maintenance Rate at 20° C.>

After charging the lithium ion rechargeable battery up to 4.2 V at a rate of 1 CmA, discharging at a rate of 1 CmA until the voltage reached 3.0 V was set as one cycle, this cycle was performed 99 times, and, at the 100th time, the capacity when one cycle of charging and discharging was performed under the same charging and discharging conditions as the initial discharge capacity was calculated.

Following the end of the measurement of the 100th time, after charging the lithium ion rechargeable battery up to 4.2 V at a rate of 1 CmA, discharging at a rate of 1 CmA until the voltage reached 3.0 V was set as one cycle, this cycle was performed 399 times, and, at the 500th time of the total charging and discharging cycles, the capacity when one cycle of charging and discharging was performed under the same charging and discharging conditions as the initial discharge capacity was calculated.

The discharge capacity maintenance rates (%) of the 100th time and the 500th time were respectively set as ratios of the discharge capacity of the 100th time with respect to the initial discharge capacity and the 500th time with respect to the initial discharge capacity. Here, the measurement was performed inside an incubator at a constant 20° C.

<Initial Discharge Capacity and Discharge Capacity Maintenance Rate at 60° C.>

The initial discharge capacity (mAh/g) and discharge capacity maintenance rate (%) at 60° C. were set as values measured in the same manner as the initial discharge capacity and discharge capacity maintenance rate at 20° C. other than setting the temperature of the incubator at a constant 60° C.

(Evaluation Results)

The evaluation results are shown in Table 1.

As is clear from Table 1, it is understood that the lithium ion rechargeable batteries of Examples 1 to 4 including a nonaqueous electrolyte containing an amine derivative as an additive and the lithium ion rechargeable battery of Example 5 including a nonaqueous electrolyte containing an amine derivative as a nonaqueous solvent undergo little deterioration of the nonaqueous electrolyte due to the charging and discharging cycle, maintain a high level of discharge capacity, and are capable of stably exhibiting the charging and discharging characteristics across a wide temperature range from a low temperature (20° C.) to a high temperature (60° C.)

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. A nonaqueous electrolyte, capable of being used in a lithium ion rechargeable battery, comprising:
an electrolytic salt; and
an amine derivative represented by the following formula (1):

TABLE 1

| | | | Examples | | | | | Comparative Examples | |
| --- | --- | --- | --- | --- | --- | --- | --- | --- | --- |
| | | | 1 | 2 | 3 | 4 | 5 | 1 | 2 |
| Nonaqueous Electrolyte | Electrolytic Salt | Type | LiPF$_6$ | LiPF$_6$ | LiPF$_6$ | LiPF$_6$ | LiPF$_6$ | LiPF$_6$ | LiPF$_6$ |
| | Nonaqueous solvent | Type | EC/DEC | EC/DEC | EC/DEC | EC/DEC | EC/Amine derivative | EC/DEC | EC/DEC |
| | | (Volume Ratio) | (1/2) | (1/2) | (1/2) | (1/2) | (1/4) | (1/2) | (1/2) |
| | | Blending ratio (wt %/vol %) | 99.5/99.53 | 97/97.15 | 99.5/99.53 | 99.5/99.53 | 100/100 | 100/100 | 99.5/— |
| | Additive | Type | Amine derivative A | Amine derivative A | Amine derivative B | Amine derivative C | — | — | Pyrocarbonate A |
| | | Blending ratio (wt %/vol %) | 0.5/0.47 | 3/2.85 | 0.5/0.47 | 0.5/0.47 | — | — | 0.5/— |
| Electric Characteristic (20° C.) | Initial | Discharge capacity (mAh/g) | 120.1 | 119.1 | 119.8 | 119.5 | 118.9 | 115.3 | 102.3 |
| | 100 cycles | Discharge capacity (mAh/g) | 118.9 | 117.9 | 117.4 | 118.3 | 115.3 | 106.1 | 92.1 |
| | | Discharge capacity maintenance rate (%) | 99 | 99 | 98 | 99 | 97 | 92 | 90 |
| | 500 cycles | Discharge capacity (mAh/g) | 108.1 | 107.2 | 107.8 | 106.4 | 104.6 | 94.1 | 75.7 |
| | | Discharge capacity maintenance rate (%) | 90 | 90 | 90 | 89 | 88 | 82 | 74 |
| Electric Characteristic (60° C.) | Initial | Discharge capacity (mAh/g) | 118.9 | 117.7 | 118.5 | 118.1 | 117 | 112.6 | 101.3 |
| | 100 cycles | Discharge capacity (mAh/g) | 108.2 | 107.1 | 105.5 | 106.3 | 102.9 | 89.0 | 81.0 |
| | | Discharge capacity maintenance rate (%) | 91 | 91 | 89 | 90 | 88 | 79 | 80 |
| | 500 cycles | Discharge capacity (mAh/g) | 97.5 | 96.5 | 98.4 | 95.7 | 93.6 | 68.0 | 68.8 |
| | | Discharge capacity maintenance rate (%) | 82 | 82 | 83 | 81 | 80 | 61 | 63 |

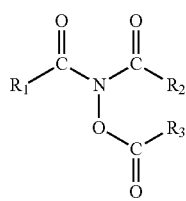

(1)

wherein, $R_1$, $R_2$, and $R_3$ may be the same or different, and represent a hydrogen atom, or a lower alkyl group, a lower alkenyl group, a lower alkoxy group, a lower alkoxycarbonyl group, a lower alkylcarbonyl group, a lower cycloalkyl group or an aryl group, which may be substituted.

2. The nonaqueous electrolyte of claim 1, wherein the amine derivative is a compound in which $R_1$, $R_2$ and $R_3$ in the formula (1) is selected from a lower alkyl group, a lower cycloalkyl group and an aryl group, which may be substituted.

3. The nonaqueous electrolyte of claim 1, wherein the lower alkyl group is a straight-chain or branched alkyl group having 1 to 6 carbon atoms.

4. The nonaqueous electrolyte of claim 3, wherein the lower alkyl group is selected from a group consisting of a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, and an isohexyl group.

5. The nonaqueous electrolyte of claim 1, wherein the lower alkenyl group is a straight-chain or branched alkenyl group having 1 to 6 carbon atoms.

6. The nonaqueous electrolyte of claim 5, wherein the lower alkenyl group is selected from a group consisting of a vinyl group, a 1-propenyl group, an allyl group, a 1-butenyl group, a 2-butenyl group, and a 3-butenyl group.

7. The nonaqueous electrolyte of claim 1, wherein the lower alkoxy group is a straight-chain or branched alkoxy group having 1 to 6 carbon atoms.

8. The nonaqueous electrolyte of claim 7, wherein the lower alkoxy group is selected from a group consisting of a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a neopentyloxy group, a tert-pentyloxy group, an n-hexyloxy group, and an isohexyloxy group.

9. The nonaqueous electrolyte of claim 1, wherein the lower alkoxycarbonyl group is a group which is derived from a lower fatty acid and in which a hydroxyl group is removed from a lower fatty acid.

10. The nonaqueous electrolyte of claim of claim 9, wherein the lower alkoxycarbonyl group is selected from a group consisting of a formyloxy group, an acetoxy group, a propionyloxy group, a butyryloxy group, an isobutyryloxy group, a valeryloxy group, an isovaleryloxy group, and a pivaloyloxy group.

11. The nonaqueous electrolyte of claim 1, wherein the lower alkylcarbonyl group is an acyl group derived from a lower fatty acid.

12. The nonaqueous electrolyte of claim 11, wherein the lower alkylcarbonyl group is selected from a group consisting of a formyl group, an acetyl group, a propionyl group, a butyryl group, an isobutyryl group, a valeryl group, an isovaleryl group, and a pivaloyl group.

13. The nonaqueous electrolyte of claim 1, wherein the lower cycloalkyl group is a cycloalkyl group having 3 to 6 carbon atoms.

14. The nonaqueous electrolyte of claim 13, wherein the lower cycloalkyl group is selected from a group consisting of a cyclopropyl group, a cyclobutyl group, a cyclopentyl group, and a cyclohexyl group.

15. The nonaqueous electrolyte of claim 1, wherein the aryl group is an aryl group having 6 to 10 carbon atoms.

16. The nonaqueous electrolyte of claim 15, wherein the aryl group is selected from a group consisting of a phenyl group, a 1-naphthyl group, and a 2-naphthyl group.

17. A lithium ion rechargeable battery comprising:
a cathode provided with a current collector having a cathode active material;
an anode provided with a current collector having an anode active material; and
a nonaqueous electrolyte including an electrolytic salt and an amine derivative represented by the following formula (1):

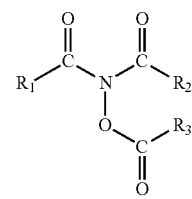

(1)

wherein, $R_1$, $R_2$, and $R_3$ may be the same or different, and represent a hydrogen atom, or a lower alkyl group, a lower alkenyl group, a lower alkoxy group, a lower alkoxycarbonyl group, a lower alkylcarbonyl group, a lower cycloalkyl group or an aryl group, which may be substituted.

18. The lithium ion rechargeable battery of claim 17, wherein the amine derivative is a compound in which $R_1$, $R_2$ and $R_3$ in the formula (1) is selected from a lower alkyl group, a lower cycloalkyl group and an aryl group, which may be substituted.

19. The lithium ion rechargeable battery of claim 17, wherein the lower alkyl group is a straight-chain or branched alkyl group having 1 to 6 carbon atoms.

20. The lithium ion rechargeable battery of claim 19, wherein the lower alkyl group is selected from a group consisting of a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, and an isohexyl group.

21. The lithium ion rechargeable battery of claim 17, wherein the lower alkenyl group is a straight-chain or branched alkenyl group having 1 to 6 carbon atoms.

22. The lithium ion rechargeable battery of claim 21, wherein the lower alkenyl group is selected from a group consisting of a vinyl group, a 1-propenyl group, an allyl group, a 1-butenyl group, a 2-butenyl group, and a 3-butenyl group.

23. The lithium ion rechargeable battery of claim 17, wherein the lower alkoxy group is a straight-chain or branched alkoxy group having 1 to 6 carbon atoms.

24. The lithium ion rechargeable battery of claim 23, wherein the lower alkoxy group is selected from a group consisting of a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a neopentyloxy group, a tert-pentyloxy group, an n-hexyloxy group, and an isohexyloxy group.

25. The lithium ion rechargeable battery of claim 17, wherein the lower alkoxycarbonyl group is a group which is derived from a lower fatty acid and in which a hydroxyl group is removed from a lower fatty acid.

26. The lithium ion rechargeable battery of claim 25, wherein the lower alkoxycarbonyl group is selected from a group consisting of a formyloxy group, an acetoxy group, a propionyloxy group, a butyryloxy group, an isobutyryloxy group, a valeryloxy group, an isovaleryloxy group, and a pivaloyloxy group.

27. The lithium ion rechargeable battery of claim 17, wherein the lower alkylcarbonyl group is an acyl group derived from a lower fatty acid.

28. The lithium ion rechargeable battery of claim 27, wherein the lower alkylcarbonyl group is selected from a group consisting of a formyl group, an acetyl group, a propionyl group, a butyryl group, an isobutyryl group, a valeryl group, an isovaleryl group, and a pivaloyl group.

29. The lithium ion rechargeable battery of claim 17, wherein the lower cycloalkyl group is a cycloalkyl group having 3 to 6 carbon atoms.

30. The lithium ion rechargeable battery of claim 29, wherein the lower cycloalkyl group is selected from a group consisting of a cyclopropyl group, a cyclobutyl group, a cyclopentyl group, and a cyclohexyl group.

31. The lithium ion rechargeable battery of claim 17, wherein the aryl group is an aryl group having 6 to 10 carbon atoms.

32. The lithium ion rechargeable battery of claim 31, wherein the aryl group is selected from a group consisting of a phenyl group, a 1-naphthyl group, and a 2-naphthyl group.

* * * * *